July 24, 1956  D. B. PECK  2,756,375
FEED-THROUGH CAPACITORS
Filed Feb. 6, 1952

Inventor
DAVID B. PECK
By Arthur G. Connolly
HIS Attorney

United States Patent Office 2,756,375
Patented July 24, 1956

2,756,375
FEED-THROUGH CAPACITORS

David B. Peck, Williamstown, Mass., assignor to Sprague Electric Company, North Adams, Mass., a corporation of Massachusetts Application February 6, 1952, Serial No. 270,139

2 Claims. (Cl. 317—242)

This invention relates to new and improved ceramic feed-through capacitors.

The prior art feed-through ceramic capacitors which this invention improves upon have been formed with an external metallic casing consisting of hex nut top with a lower threaded body portion surrounding a ceramic tube of greater length than said casing which has been metallized on a large part of its surface, this tube in turn surrounding a metallic feed-through conductor. All of the elements have been sealed together in a fixed relationship in this type of unit by solder.

While effective for many purposes, these tubular ceramic high frequency bypass capacitors have been fragile and susceptible to fracture due to bending moments applied on the feed-through wire, from shock and from forces applied by or through the outer casing. Such fractures, while in some cases they do not effect immediate electrical failure, are apt to accelerate the effects of humidity and lower the breakdown voltage and the like.

It is an object of this invention to overcome the foregoing and related disadvantages of the prior art. Another object is to produce improved feed-through ceramic capacitors. These and still further objects of the invention, as well as the advantages of it, will appear more fully from the following description when considered in connection with the accompanying drawings, in which.

In its broader aspects the invention is concerned with feed-through ceramic capacitors employing a metallic casing consisting of a top and a lower depending body portion surrounding a series of metallized ceramic discs which in turn surround a feed-through wire, the entire assembly being sealed in a fixed relationship in which the capacitor element is not subject to tension or shear. This is necessary because the thin dielectric wafers and tubes fused are quite brittle and fragile. The top portion of the casing is preferably formed so as to be engaged by a wrench.

In one of its more limited embodiments the invention is concerned with a feed-through capacitor composed of a centrally located feed-through wire, at least one annular ceramic disc provided with electrical coatings surrounding and attached to said wire, and an outer housing consisting of an upper nut-like portion and a lower threaded portion, the entire unit being sealed together in a manner such that bending moments applied to the feed-through wire are not transmitted to said ceramic elements.

In a further limited embodiment the invention is concerned with a capacitor of the type described having a series of electrically coated ceramic discs surrounding a central feed-through wire, said discs being positioned within the threaded portion of an outer casing.

A third limited embodiment of the invention is concerned with a feed-through capacitor containing several electrically coated ceramic discs positioned around a feed-through wire within a top body portion of a casing, and attached electrically to an end housing positioned on this casing.

Figure 1:
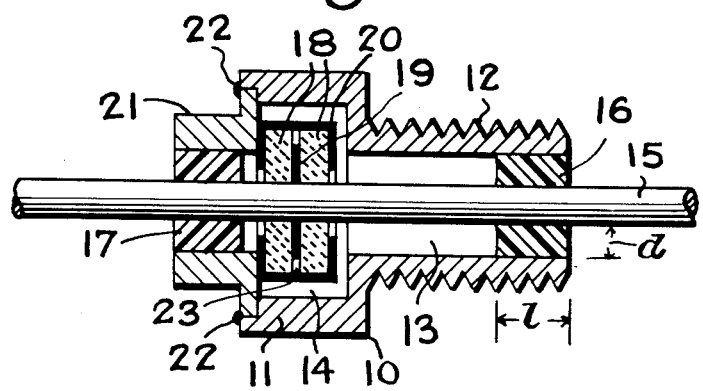
Figure 1 shows a sectional view of one modification of the invention.

Referring now to the drawings, and in particular to Figure 1 in which the third modification of the invention mentioned above is shown, it is seen that the capacitor of this invention is formed with a feed-through wire 15 sealed within a hollow casing 10 by resin end seals 16 and 17. This casing has an upper portion 11, the outersides of which are preferably formed as a hex nut, and contains body cavities 13 and 14, the cavity 13 being positioned internally of a thread section 12. The upper cavity 14 contains two ceramic plates 18, the internal adjacent surfaces of which are provided with an electrically conductive coating 19, which is soldered or otherwise electrically secured to the wire 15. The outer sides of these discs are also provided with an electrically conductive coating which is insulated from the internal coating by a space 23. This outer coating 20 is soldered to an annular cap element 21, which in turn is soldered to the upper portion 11 of the casing 10 at 22.

Figure 2:
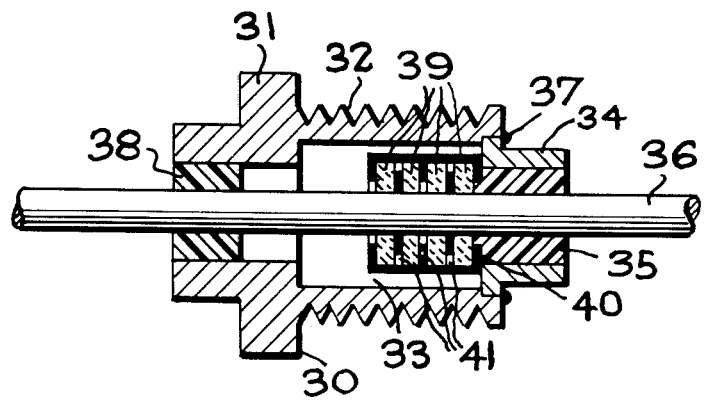
Figure 2 illustrates a second modification of the invention in section.

The embodiment of the invention shown in Figure 2 is very similar to that shown in Figure 1, having a casing 30 surrounding a series of ceramic discs 39, which in turn surround and are connected to a feed-through conductor 36, the entire assembly being held in fixed relationship and sealed by the end seals 35 and 38. This modification, however, contains one major difference over that shown in Figure 1. Here more than two ceramic plates are used, and the alternate adjacent surfaces of these plates are connected together by an electrically conductive layer 41, while the outsides of these plates and the faces between plates not connected by the coatings 41 are connected together by another coating 40, which is in turn attached to the end cap 34, as by soldering. This end cap 34 is in turn soldered at 37 to the lower threaded body portion 32 of the unit. It is noted that this differs from the preceding embodiment because here the ceramic plates are not placed within the upper portion 31 of the casing, which is preferably formed as a nut. This modification of the invention is not to be limited to four (two pair) of individual ceramic discs positioned within the cavity 33 of the housing 30, as single wafers or a plurality may be used, depending upon the design characteristics desired.

As previously indicated, the design of the resin end seals forms the preferred embodiment of the invention. I have found that the disadvantages of prior constructions can be completely overcome by maintaining a certain and specific relationship between the diameter and abutting length of the resin seal. Referring again to Figure 1, and specifically to end seal 16, the distance between the outer surface of the feed-through conductor 15 and the inner surface of housing 12 is referred to as "$d$," while the abutting length along the conductor surfaces is referred to as "$l$." Since the feed-through conductor may have a high D. C. or low frequency A. C. current to carry, and also since it is generally employed as a tie point terminal at one or both ends, it is customary to employ a relatively rigid, heavy conductor, despite the low electrical capacity of the capacitor section. The diameters employed for such conductors range from about 0.025" to as high as 0.5" and more, with 0.055" being a common figure. In the past, considerable difficulty has come about as a result of bending moments applied to the feed-through conductor in planes of appreciable angle to the axis of the conductor. These moments have been transmitted to the relatively fragile ceramic dielectric piece by the relatively rigid conductor and resulted in cracking thereof. I overcome this by maintaining the ratio between "l" and "d" at least 1:1 and preferably in the range of 3:2. For rigid resin materials and those containing high concentrations or inorganic fillers, the lower ratios are satisfactory while the higher ratio is required for good results when employing materials which are elastomeric or soft in nature, as for example, rubber, polyethylene, polytetrafluoroethylene, and silicone rubbers.

While the specific resins employed in all the modifications of the invention have not been set forth in detail, they are those non-conductive resins which are well-known to the art. Some of them are epichlor-hydrin-bisphenol condensation products, phenol-formaldehyde, urea-formaldehyde, Teflon, nylon, Dacron, natural and synthetic rubber and the like. It is to be understood that these resins may be filled with appropriate fillers such as powdered ceramic, powdered silica, bentonite, wood flour and the like. The adherence to metal of the resin is advisably good, hence the preferred resins are the aforesaid epichlorohydrin condensation types, which may be cross-linked for optimum rigidity with trace amounts of amines, acids, etc.

The electrically conductive layers applied to the ceramic plates of this invention are also not unknown to the art, and may consist of finely divided silver or, in certain applications, other conductive particles of a similar nature. Reference is made to the various Bureau of Standards' publications on printed circuits for further data on suitable conductive coatings.

As many apparently widely different embodiments of this invention may be made without departing from the spirit and scope hereof, it is to be understood that my invention is not to be limited to the specific embodiments set forth, except as defined in the appended claims.

I claim:

1. A feed-through capacitor having an externally threaded tubular metal housing with an internal radially-directed wall, a feed-through conductor at least 0.025 inches thick extending through the housing, dielectric structure within the housing and including at least one annular ceramic disc encircling the conductor, said disc being relatively fragile as compared to the conductor, a first electrode layer on the disc at its central opening and electrically connected to the conductor, a second electrode layer on the disc in capacitive relation to the first layer and electrically connected to the radially-directed wall, the disc being adherently secured to the conductor and to said wall, and the conductor being sealed to the inside of the housing on both sides of the dielectric structure by means of rigid resin sheathes having lengths at least as large as the radial distance between the conductor and the housing at the sealing sites.

2. The combination of claim 1 in which the resin is a cross-linked derivative of an epichlorhydrin-bis-phenol condensation product.

References Cited in the file of this patent

UNITED STATES PATENTS

| | | |
|---|---|---|
| 1,361,328 | Hachmann | Dec. 7, 1920 |
| 2,348,693 | Minnium | May 9, 1944 |
| 2,430,433 | Minnium | Nov. 4, 1947 |
| 2,444,333 | Castan | June 29, 1948 |
| 2,491,681 | Minter | Dec. 20, 1949 |
| 2,552,306 | Beverly | May 8, 1951 |
| 2,603,675 | Binek | July 15, 1952 |

FOREIGN PATENTS

| | | |
|---|---|---|
| 899,832 | France | Sept. 4, 1944 |

OTHER REFERENCES

"Erie Button Silver Mica Condensers," Catalog Sheet of Erie Resistor Corp.